United States Patent [19]

Barlow

[11] 4,096,569
[45] Jun. 20, 1978

[54] DATA PROCESSING SYSTEM HAVING DISTRIBUTED PRIORITY NETWORK WITH LOGIC FOR DEACTIVATING INFORMATION TRANSFER REQUESTS

[75] Inventor: George J. Barlow, Tewksbury, Mass.

[73] Assignee: Honeywell Information Systems Inc., Waltham, Mass.

[21] Appl. No.: 754,480

[22] Filed: Dec. 27, 1976

[51] Int. Cl.² .............................................. G06F 3/04
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,800,287 | 3/1974 | Albright | 364/200 |
| 3,993,981 | 11/1976 | Cassarino, Jr. et al. | 364/200 |
| 3,996,561 | 12/1976 | Kowal et al. | 364/200 |

*Primary Examiner*—Melvin B. Chapnick
*Attorney, Agent, or Firm*—John S. Solakian; Nicholas Prasinos; Ronald T. Reiling

[57] ABSTRACT

A common electrical bus for coupling a plurality of units in a data processing system for the transfer of information therebetween. The units are coupled in a priority arrangement which is distributed thereby providing priority logic in each of the units and allowing bus transfer cycles to be generated in an asynchronous manner. Each of the units includes priority logic which includes logic elements for requesting a bus cycle, such request being granted if no other higher priority unit has also requested a bus cycle. The request for and an indication of the grant of the bus cycle are stored in each unit so requesting and being granted the bus cycle respectively, only one such unit being capable of having the grant of a bus cycle at any given time, whereas any number of such units may have its request pending at any particular time. Upon completion of the bus cycle, the priority logic is coupled to deactivate the indication of the grant of the bus cycle, and in response thereto, to deactivate the request of the particular unit which has just had access to the bus.

13 Claims, 3 Drawing Figures

DATA PROCESSING SYSTEM HAVING DISTRIBUTED PRIORITY NETWORK WITH LOGIC FOR DEACTIVATING INFORMATION TRANSFER REQUESTS

BACKGROUND OF THE INVENTION

The apparatus of the present invention generally relates to data processing systems and more particularly to a priority network for providing transfer cycles over a common bus coupling a plurality of units in such system.

The apparatus of the present invention is an improvement to the priority logic described in U.S. Pat. No. 4,030,075, issued on June 14, 1977, which patent is incorporated herein by reference. Such priority logic included in the priority network of such patent application is distributed in each of the units coupled to the common bus so as to enable priority determination and thereby the granting of a bus cycle to the highest priority requesting unit without the need for a bus monitor for example in a central processor which may be one of the units coupled to the bus. Each such priority logic includes three bistable elements, one of which indicates an internal request for use of the bus, another of which indicates on the bus that an internal request has been made, and a further one is provided to indicate that a bus cycle has been granted for this unit. Only one such unit's priority logic may have its so-called bistable element indicate that a bus cycle has been granted. The priority logic in more than one unit may have their so-called request bistable elements set to indicate that they desire bus cycles. Typically, the unit transferring information to another unit receives a response. Such response may either be a signal indicating that the information transferred has been accepted (an ACK signal), that the information transferred has not been accepted (a NACK signal), or a signal indicating that the information has not been accepted by the receiving unit but that such receiving unit will be enabled to so receive such information possibly during the next bus cycle (a WAIT signal). In response to either of these signals, it has been shown in such aforementioned patent that the so-called grant bistable element which has been set, may be reset so that each of the units on the bus may again in parallel attempt to gain access to the bus, thereby avoiding a situation where one unit which had previously been granted access to the bus is unable to gain such access until its receiving unit responds by indicating it has received such information. In such aforementioned patent, it was shown that the so-called ACK or NACK signals would also cause the so-called request bistable element to be reset or cleared. However in so resetting such request bistable element it is important that only the unit which had its grant bistable element set have its request bistable element reset. Otherwise, each of the request bistable elements in each of the units would be reset. This would then require that each of such units have its so-called request bistable element set again. In order to avoid such operation, it was necessary to include logic by which the unit so setting its so-called grant bistable element retain a history of such action. This required additional logic in the system and, accordingly, it was considered desirable to eliminate such excess logic thereby reducing the space and power requirements in the system while still maintaining priority logic which was distributed, asynchronous in nature and which retained the speed required of the system.

Accordingly, it is a primary object of the present invention to provide improved priority logic for use in a data processing system in which a plurality of units are coupled over a common electrical bus.

SUMMARY OF THE INVENTION

The improved priority logic of the present invention is provided in a data processing system having a plurality of units coupled to transfer information over a common electrial bus, each of the units capable of either or both transferring or receiving information, wherein such priority logic is included in a distributed priority network and wherein such priority logic is included in each of the units coupled with the common bus. Each such priority logic comprises a first bistable element for asynchronously indicating that a representative unit is ready to transfer information over the bus, a second bistable element responsive to the first bistable element for generating a first signal on the bus indicating to each of the units that the representative unit is ready to transfer information over the bus, apparatus responsive to the second bistable element in each of the units having a higher priority than the representative unit for indicating that the representative unit is the highest priority unit and a third bistable element responsive to the first signal generated by the second bistable element and an indication that there is no other higher priority unit ready to transfer information over the bus, for generating signal on the bus. Further provided is apparatus which is responsive to the receipt of the second signal from the bus for generating a strobe signal for enabling the receipt of information from the representative unit and further apparatus which is responsive to the acknowledgement that the information has been so received, for disabling the third bistable element of the representative unit. Further logic is also provided which is responsive to the disabling of the third bistable element for disabling the second bistable element of the representative unit.

BRIEF DESCRIPTION OF THE DRAWINGS

For a fuller understanding of the nature and objects of the invention, reference should be made to the following detailed description taken in conjunction with the accompanying drawings wherein.

DETAILED DESCRIPTION OF THE PREFERRED EMBODIMENT

Figure 1:
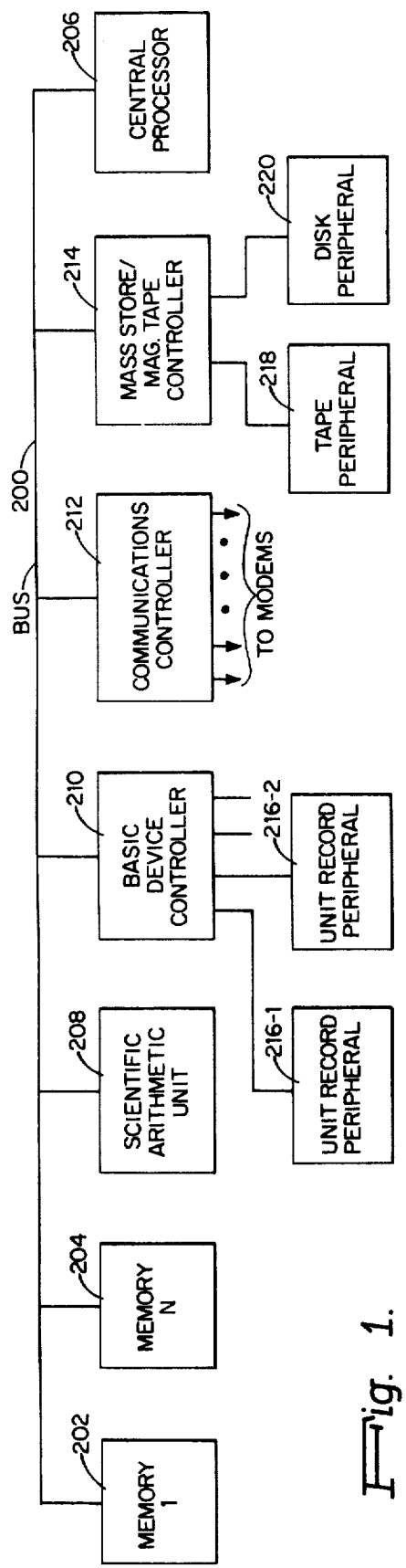
FIG. 1 is a general block diagram of the system of the present invention.

The data processing bus of the present invention provides a communication path between two units in the system. The bus is asynchronous in design enabling units of various speeds connected to the bus to operate efficiently in the same system. The design of the bus of the present invention permits communications including memory transfers, interrupts, data, status, and command transfers. The overall configuration of a typical system is shown in FIG. 1. For a further description of the bus and interface logic of such system, U.S. Pat. No. 3,993,981, issued on Nov. 23, 1976, which is incorporated herein by reference, should be consulted.

The bus permits any two units to communicate with each other at a given time via a common (shared) signal path. Any unit wishing to communicate, requests a bus cycle. When that bus cycle is granted, that unit becomes the master and may address any other unit in the system as the slave. Most transfers are in the direction of master to slave. Some types of bus interchange require a response cycle (read memory for example). In cases where a response cycle is required, the requestor assumes the role of the master, indicates that a response is required, and identifies itself to the slave. When the required information becomes available, (depending on slave response time), the slave now assumes the role of the master, and initiates a transfer to the requesting unit. This completes the interchange which has taken two bus cycles in this case. Intervening time on the bus between these two cycles may be used for other system traffic not involving these two units.

A master may address any other unit on the bus as a slave. It does this by placing the slave address on the address leads. There may be 24 address leads for example which can have either of two interpretations depending on the state of an accompanying control lead. It should be noted that as used in this specification, the terms binary ZERO and binary ONE are used respectively to refer to the low and high states of electrical signals. In essence, when the memory is being addressed, the bus enables up to $2^{24}$ bytes to be directly addressed in memory. When units are passing control information, data or interrupts, they address each other by channel number. The channel number allows up to $2^{10}$ channels to be addressed by the bus. Along with the channel number, a six bit function code is passed which specifies which of up to $2^6$ possible functions this transfer implies.

When a master requires a response cycle from the slave, it indicates this to the slave by one state (read command) of a control lead named BSWRITE- (the other state thereof not requiring a response, i.e. a write command). In addition, the master may provide its own identity to the slave by means of a channel number. The data leads, as opposed to the bus address leads, are coded to indicate the master's identity when a response is required from the slave. The response cycle is directed to the requestor by a non-memory reference transfer. The control lead, indicated as a second-half bus cycle (BSSHBC-), is enabled to designate that this is the awaited cycle (as compared to an unsolicited transfer from another unit).

Figure 3:
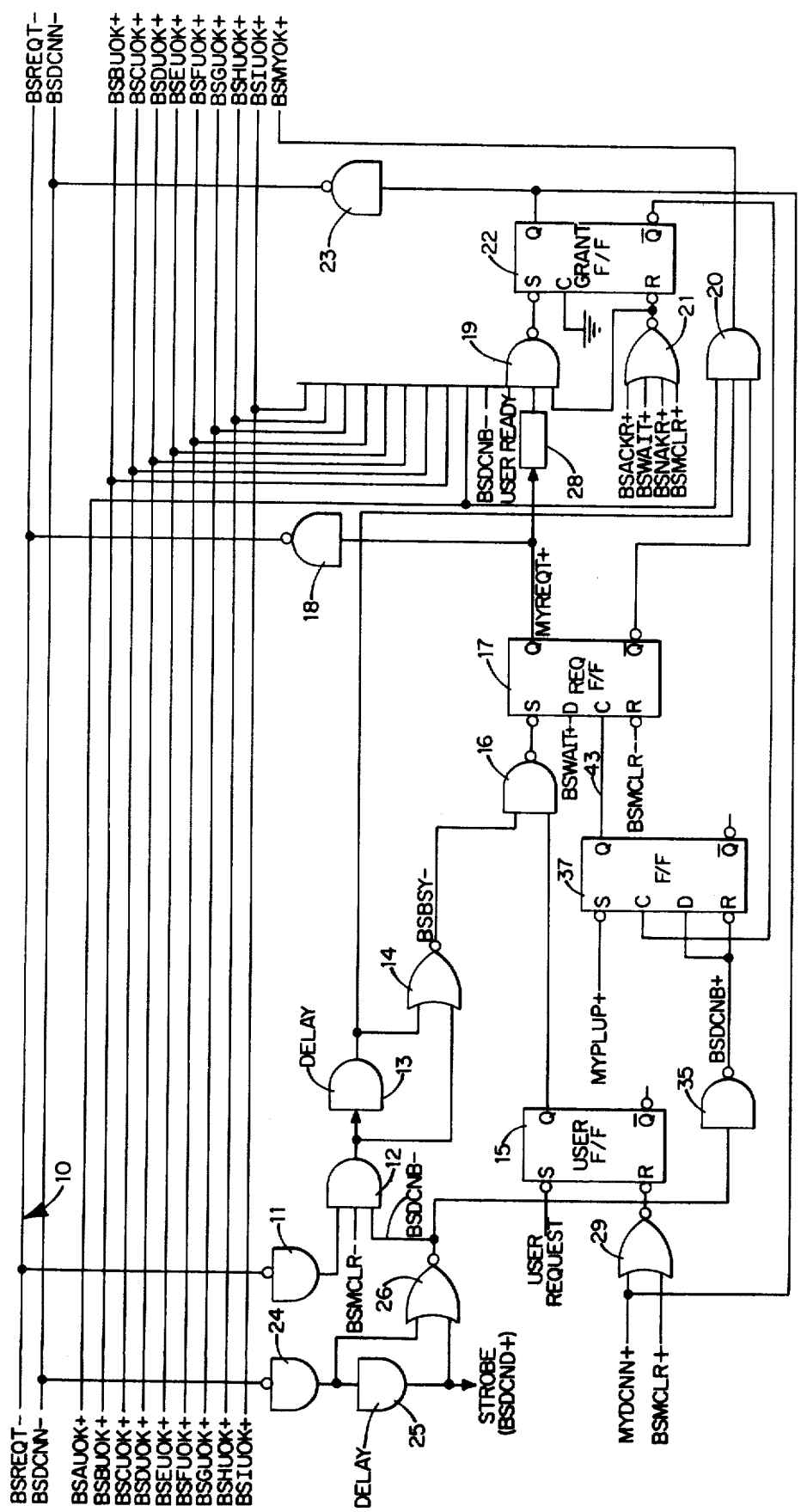
FIG. 3 is a detailed logic diagram of the improved priority logic of the present invention.

The distributed tie-breaking network provides the function of granting bus cycles and resolving simultaneous requests for use of the bus. Priority is granted on the basis of physical position on the bus, the highest priority being given to the first unit on the bus. The logic to accomplish the tie-breaking function is shown in FIG. 3 and is distributed identically among all units connected to the bus. In a typical system, the memory is granted the highest priority and the central processor is granted the lowest priority with the other units being positioned on the basis of their performance requirements.

Thus, referring to FIG. 1, a typical system of the present invention includes a multiline bus 200 coupled with memory 1-202 through memory N-204, such memories having the highest priority and with the central processor 206 having the lowest priority. Also connected on the bus may be included for example a scientific arithmetic unit 208 and various controllers 210, 212 and 214. Controller 210 may be coupled to control for example four unit record peripheral devices 216. Controller 212 may be used to provide communications control via modem devices whereas controller 214 may be utilized to control mass storage devices such as a tape peripheral device 218 or a disk peripheral device 220. As previously discussed, any one of the devices coupled with the bus 200 may address a memory or any other unit connected to the bus. Thus tape peripheral 218 may, via controller 214, address memory 202. As shall be hereinafter discussed, each of such units directly connected to the bus includes a tie-breaking logic as illustrated and discussed with respect to FIG. 3, and further each one of such units includes address logic as discussed in either of the aforementioned United States patents. Units not directly connected to the bus, such as units 216, 218 and 220 also have their own tie-breaking logic.

A channel number will exist for every end point in a particular system with the exception of the memory type processing elements which are identified by the memory address. A channel number is assigned for each such device. Full duplex devices as well as half-duplex devices utilize two channel numbers. Output only or input only devices use only one channel number each. Channel numbers are easily variable and accordingly one or more hexadecimal rotary switches (thumb wheel switch) may be utilized for each such unit connected with the bus to indicate or set the unit's address. Thus when a system is configured, the channel number may be designated for the particular unit connected to the bus as may be appropriate for that particular system. Units with multiple input/output (I/O) ports generally will require a block of consecutive channel numbers. By way of example, a four port unit may use rotary switches to assign the upper 7 bits of a channel number and may use the lower order 3 bits thereof to define the port number to distinguish input ports from output ports. The channel number of the slave unit will appear on the address bus for all non-memory transfers. Each unit compares that number with its own internally stored number (internally stored by means of the rotary switches). The unit which achieves a compare is, by definition, the slave, and must respond to that cycle. Generally, no two points in a single system will be assigned to the same channel number.

There are various output and input functions. One of the output functions is a command whereby a data quantity, for example 16 bits is loaded into the channel from the bus. The meanings of the individual data bits are component specific, but the data quantity is taken to mean the data to be stored, sent, transmitted etc. depending upon the specific component functionality. Another such output function is a command whereby for example a 24 bit quantity is loaded into a channel address register (not shown). The address is a memory byte address and refers to the starting location in memory where the channel will commence input or output of data. Various other output functions include an output range command which defines the size of the memory buffer assigned to the channel for a specific transfer, an output control command which by its individual bits causes specific responses, output task functions such as print commands, output configuration which is a command to indicate functions such as terminal speed, card reader mode, etc., and output interrupt control which is a command which loads for example a 16-bit word into the channel. The first ten bits indicate the central processor channel number and the remaining six bits indicate the interrupt level. Upon interrupt, the central processor channel number is returned on the address bus while the interrupt level is returned on the data bus.

The input functions include functions similar to the output functions except in this case the input data is transferred from the device to the bus. Thus, input functions include the input data, input address and input range commands as well as the task configuration and interrupt commands. In addition, there is included the device identification command whereby the channel places its device identification number on the bus. Also included are two input commands whereby a status word 1 or a status word 2 is placed on the bus from the channel as presently discussed.

The indication from status word 1 may include for example whether or not the specific device is operational, whether it is ready to accept information from the bus, whether there is an error status or whether attention is required. Status word 2 may include for example an indication of parity, whether there is a non-correctable memory or a corrected memory error, whether there is a legal command or for example whether there is a non-existent device or resource.

As previously discussed, a unique device identification number is assigned to every different type of device which is connected to the bus. This number is presented on the bus in response to the input function command entitled input device identification. For convenience, the number is separated into 13 bits identifying the device (bits 0 through 12) and three bits identifying certain functionality of the device (bits 13 through 15) as may be required.

A unit wishing to interrupt the central processor requests a bus cycle. When the bus cycle is granted, the unit places its interrupt vector on the bus, the interrupt vector including the channel number of the central processor and the interrupt level number. The unit thus provides, as its interrupt vector, the master's channel number and its interrupt level number. If this is the central processor's channel number, the central processor will accept the interrupt if the level presented is numerically smaller than the current internal central processor level and if the central processor has not just accepted another interrupt. Acceptance is indicated by a bus ACK signal (BSACKR-). If the central processor cannot accept the interrupt, a NAK signal is returned (BSNAKR-). Devices receiving a NAK (sometimes referred to as NACK) signal will retry when a signal indicating resume normal interrupting is received from the CP (BSRINT-). The central processor issues this signal when it has completed a level change and therefore may be capable of accepting interrupts once again. The channel number of the master is supplied in the vector for use since more than one channel may be at the same interrupt level. Interrupt level 0 is of special significance since it is defined to mean that the unit shall not interrupt.

Figure 2:
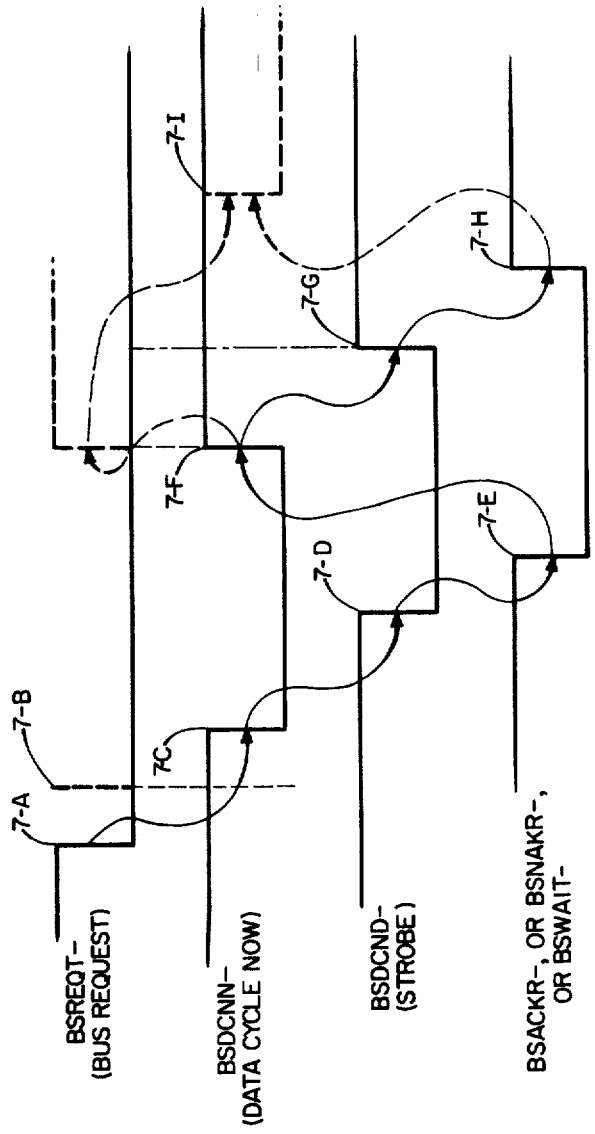
FIG. 2 is a timing diagram of the operation of the common bus of the present invention.

FIG. 2 illustrates the bus timing diagram and will be discussed more specifically hereinafter. Generally, however the timing is as follows. The timing applies to all transfers from a master unit to a slave unit connected to the bus. The speed at which the transfer can occur is dependent upon the configuration of the system. That is, the more units connected to the bus and the longer the bus, then, due to propagation delays, the longer it takes to communicate on the bus. On the other hand, the lesser amount of units on the bus decreases the response time. Accordingly, the bus timing is truly asynchronous in nature. A master which wishes a bus cycle makes a bus request. The signal BSREQT- is common to all units on the bus and if a binary ZERO, indicates that at least one unit is requesting a bus cycle. When the bus cycle is granted, the signal BSDCNN- becomes a binary ZERO indicating that a tie-breaking function as more specifically discussed with respect to FIG. 3, is complete and that one specific master now has control of the bus. At the time the signal BSDCNN- becomes a binary ZERO, the master applies the information to be transferred to the bus. Each unit on the bus develops an internal strobe from the signal BSDCNN-. The strobe is delayed for example approximately 60 nanoseconds from the reception of the binary ZERO state of the BSDCNN- signal. When the delay is complete in the slave, the bus propagation time variations will have been accounted for and each slave unit would have been able to recognize its address (memory address or channel number). The addressed slave can now make one of three responses, either an ACK, a NACK or a WAIT signal, or more specifically a BSACKR-, a BSNAKR, or a BSWAIT- signal. The response is sent out on the bus and serves as a signal to the master that the slave has recognized the requested action. The control lines then return to the binary ONE state in the sequence as shown in FIG. 2. Thus the bus handshake if fully asynchronous and each transition will only occur when the preceding transition has been received. Individual units may therefore take different lengths of time between the strobe and the ACK, etc., transition depending on their internal functionability. A bus timeout function exists to prevent hang ups which could occur.

The tie-breaking function, more specifically described with respect to FIG. 3, is that of resolving simultaneous requests from different units for service and granting bus cycles on a basis of a positional priority system. As indicated hereinbefore, the memory has the highest priority and the central processor has the lowest priority and they reside physically at opposite ends of the bus 200. Other units occupy intermediate positions and have priority which increases relative to their proximity to the memory end of the bus. The priority logic of FIG. 3 is included in each one of the units directly connected to the bus in order to accomplish the tie-breaking function, it being noted at this point that element 28 is only included in the highest priority unit as dicussed hereinafter.

Each such unit's priority network includes a grant flip-flop 22. At any point in time, only one specific grant flip-flop may be set and that unit is by definition the master for that specific bus cycle. Any unit may make a user request at any time thus setting its user flip-flop 15. At any time therefore, many user flip-flops may be set, each representing a future bus cycle. In addition, each unit on the bus contains a request flip-flop 17. When all units are considered together, the request flip-flops may be considered as a request register. It is the outputs of this request register that supply the tie-breaking network which functions to set only one grant flip-flop no matter how many requests are pending. More specifically, if there were no pending requests, then no request flip-flops would be set. The first user flip-flop to set would cause its request flip-flop to set. This in turn would inhibit, after a short delay as hereinafter described, other devices from setting their request flip-flops. Thus what occurs is that a snapshot of all user requests is taken for the given period in time (the delay's period). The result is that a number of request flip-flops may be set during this delay period depending upon their arrival. In order to allow the request flip-flops to have their outputs become stable, each unit includes such delay in order to insure that such stabilization has occurred. A particular grant flip-flop is set if the unit associated therewith has its request flip-flop set and the delay time has elapsed and no higher priority unit wants the bus cycle. A strobe signal is then generated after another delay period and finally the grant flip-flop is cleared (reset) when the master receives an ACK, NACK or WAIT signal from the slave unit.

As indicated hereinbefore, there are three possible slave responses, the ACK, the WAIT or the NACK signal. In addition, there is a fourth state in which there is no response at all. In the case where no unit on the bus recognizes the transfer as addressed to it, no response will be forthcoming. A time out function will then take place and a NACK signal will be received thereby clearing the bus. An ACK signal will be generated if the slave is capable of accepting the bus transfer from the master and wishes to do so. The WAIT response is generated by the slave if the slave is temporarily busy and cannot accept a transfer at this time. Upon receipt of the WAIT signal, the master will retry the cycle at the next bus cycle granted to it and continue to do so until successful. Some of the causes of a WAIT response from a slave, when the central processor is the master, are for example, when the memory is a slave and the memory is responding to a request from another unit or when a controller is a slave, for example, if the controller is waiting for a response from memory or if the controller has not yet processed the previous input/output command. When a controller is the master and the central processor is the slave, the central processor may respond with an ACK or a NACK signal to the controller, but not a WAIT signal. In addition, the memory when it is the master cannot be caused to wait whether the slave unit is a central processor or a controller. The NACK signal indicated by the slave means that it cannot accept a transfer at this time. Upon receipt of a NACK signal, a master unit will not immediately retry but will take specific action depending upon the type of master.

As generally indicated hereinbefore, there are basic timing signals on the bus which accomplish the handshaking function thereof. These five signals, as discussed hereinbefore, are bus request signal (BSREQT-) which when a binary ZERO indicates that one or more units on the bus have requested the bus cycle; the data cycle now signal (BSDCNN-) which when a binary ZERO indicates a specific master is making a bus transfer and has placed information on the bus for use by some specific slave; the ACK signal (BSACKR-) which is a signal generated by the slave to the master that the slave is accepting this transfer by making this signal a binary ZERO; the NAK signal (BSNAKR-) which is a signal generated by the slave to the master indicating to the master when it is a binary ZERO that it is refusing this transfer; and the WAIT signal (BSWAIT-) which is a signal generated by the slave to the master indicating when it is a binary ZERO that the slave is refusing the transfer.

In addition, there may be as much as fifty information signals which are transferred as the information content of each bus cycle. These signals are valid for use by the slave on the leading edge of the strobe signal.

With more particular reference to the timing diagram of FIG. 2, in every bus cycle there are three identifiable parts, more particularly, the period (7-A to 7-C) during which the highest priority requesting device wins the bus, the period (7-C to 7-E) during which the master unit calls a slave unit and in so calling provides data and address information, and the period (7-E to 7-G) during which the slave responds. When the bus is idle the bus request signal (BSREQT-) is a binary ONE. The bus request signal's negative going edge at time 7-A starts a priority net cycle. There is an asynchronous delay allowed within the system for the priority net to settle (at time 7-B) and a master user of the bus to be selected. The next signal on the bus is the BSDCNN- or data cycle now signal. The BSDCNN- signal's transition to a binary ZERO at time 7-C means that use of the bus has been granted to a master unit. Thereafter, the second phase of bus operation means the master has been selected and is now free to transfer information on the data, address and control leads of the bus 200 to a slave unit that the master so designates.

The slave unit prepares to initiate the third phase of bus operation beginning at the negative going edge of the strobe or BSDCND- signal. The strobe signal is delayed, for example, sixty (60) nanoseconds from the negative going edge of BSDCNN- signal by delay line 25 of FIG. 3. Upon the occurrence of the negative going edge of the BSDCND- signal at time 7-D, the slave unit can now test to see if this is its address and if it is being called to start the decision making process of what response it is to generate. Typically, this will cause an acknowledge signal (BSACKR-) to be generated by the slave unit or in the non-typical cases a BSNAKR- or BSWAIT- signal or even no response at all (for the case of a non-existent slave) may be generated as herein described. The negative going edge of the acknowledge signal at time 7-E when received by the master unit, causes the master's BSDCNN- signal to go to a binary ONE at time 7-F. The strobe signal returns to the binary ONE state at time 7-G, which is a delay provided by delay line 25 from time 7-F. The manner in which the ACK, NAK and WAIT signals are generated is explained in either of the aforementioned United States patents.

Thus, in the third phase of bus operation, the data and address on the bus are stored by the slave unit and the bus cycle will begin to turn off. The bus cycle is essentially complete when BSDCNN- goes to a binary ONE at which time another priority net resolution is enabled. The bus cycle is complete when the ACK, etc. signal goes to a binary ONE state at time 7-H. A bus request signal may, at time 7-F, be generated and if not received, this means that the bus will return to the idle state, and accordingly the BSREQT- signal would go to the binary ONE state. If the bus request signal is present at that time, i.e., a binary ZERO as shown, it will start the asynchronous priority net selection process following which another negative going edge of the BSDCNN- signal will be enabled as shown by the dotted lines at time 7-I. It should be noted that this priority net resolution need not wait or be triggered by the positive going edge of the acknowledge signal at time 7-H, but may in fact be triggered at a time 7-F just following the transition of the bus to an idle state if thereafter a unit desires a bus cycle. This process repeats in an asynchronous manner.

Now referring to the priority net logic of FIG. 3, the priority net cycle is initially in an idle state and the bus request signal (BSREQT-) on line 10 is a binary ONE. When this bus request signal is a binary ONE, the output of receiver (inverting amplifier) 11 will be a binary ZERO. The output of receiver 11 is coupled to one input of gate 12. The other inputs to gate 12 are the bus clear signal which is normally a binary ONE and the output of gate 26 which is normally a binary ONE also. The output of gate 12, during the bus idle state is thus a binary ZERO, and thus the output of the delay line 13 will be a binary ZERO. The input and the output of the delay line 13 being a binary ZERO allows the output of NOR gate 14 (BSBSY-) to be a binary ONE. When one of the units connected to the bus desires a bus cycle, it asynchronously sets its user flip-flop 15 so that its Q output is a binary ONE.

Thus, with the bus in the idle state, the first event that occurs as the bus goes to the busy state is that the user sets its user request flip-flop 15. When both inputs to gate 16 are a binary ONE state, the output thereof is a binary ZERO. This sets the request flip-flop 17 so that its Q output (MYREQT+) is a binary ONE. Thus, in an asynchronous manner, the Q output of request flip-flop 17 will be a binary ONE. This operation can be coincidentally occurring in the similar logic of the other units connected with the bus.

The binary ONE state of the MYREQT+ signal will be placed on line 10 of the bus via driver 18 as a binary ZERO. Thus referring to the timing diagram of FIG. 2, the BSREQT- signal goes negative or to a binary ZERO state. Any request to the system from any one of the request flip-flops 17 of the various units connected to the bus will thus hold line 10 in the binary ZERO state. The delay line 13 includes sufficient delay to compensate for the propagation delay encountered by elements 14, 16 and 17. Thus, even though a device sets its request flip-flop 17, this does not mean that a higher priority device, which also requests a bus cycle, will not take the next bus cycle. For example, if a lower priority device sets its request flip-flop 17, the binary ZERO signal on line 10 is fed back to all devices, including the higher priority device, which in turn generates a binary ONE state at the output of its gate 12 so as to generate a binary ZERO state at the output of gate 14, thereby disabling the setting of the request flip-flop 17 of such other higher priority device, if in fact the user flip-flop 15 of such higher priority device had not already been set. Once the delay time of, for example 20 nanoseconds has expired and the output of delay 13 of such higher priority device is now a binary ONE state, then the output of gate 14 will be a binary ZERO state so that independent of whether or not the user flip-flop 15 of such higher priority device has been set, the output of gate 16 will be a binary ONE thereby disabling the setting of request flip-flop 17. Thus during such time frame, all devices have their request flip-flop 17 set if in fact they are requesting service as indicated by the setting of their user flip-flop 15. After the delay time provided by element 13 of the device first requesting a bus cycle, a device not having had its request flip-flop 17 set cannot do so until after the priority cycle is completed. Thus the higher priority device will win the bus even if its user flip-flop is set a few nanoseconds after the lower priority device sets its flip-flop.

Thus, all of the request flip-flops 17 for devices seeking a bus cycle will have been set during such interval as indicated by the delay line arrangement of delay line 13. Notwithstanding that many of such devices coupled with the bus may have their request flip-flops set during such time interval, only one such device may have its grant flip-flop 22 set. The device that has its grant flip-flop 22 set will be the highest priority device seeking the bus cycle. When such highest priority device seeking a bus cycle has completed its operation during such bus cycle, the other devices which have their request flip-flops set, will again seek the next such bus cycle and so on. Thus the $\bar{Q}$ output of request flip-flop 17 in addition to being coupled to driver 18 is also coupled to one input of NAND gate 19 via element 28. Element 28 is no more than a direct connection for each unit's priority logic, except that unit (usually the memory 202) which is coupled to the highest priority end of the bus 200, in which sole case element 28 is a delay element as explained hereinafter. The $\bar{Q}$ output of flip-flop 17 is coupled to one input of AND gate 20. The other inputs to gate 19 are received from the higher priority devices and more particularly, for example, nine preceding higher priority devices. These signals received from the higher priority devices are shown to be received from the left-hand side of FIG. 3 as signals BSAUOK+ through BSIUOK+. If any one of such nine signals is a binary ZERO, this will mean that a higher priority device has requested a bus cycle and accordingly this will inhibit the current device from having its grant flip-flop 22 set and thereby disable it from having the next bus cycle.

The other inputs received by gate 19 are from the NOR gate 26, i.e., the BSDCNB- signal and the output of NOR gate 21. In addition, a User Ready signal may be received from the particular unit's other logic by which, the particular unit, even though granted a bus cycle, may delay it by changing the User Ready signal to the binary ZERO state. That is, the unit even though not ready for a bus cycle may request it and set the User Ready signal to a binary ZERO, in anticipation that it will be ready by the time the bus cycle is granted. The output of NOR gate 26 is normally a binary ONE and if all other inputs to gate 19 are a binary ONE, then grant flip-flop 22 will be set. The other input from gate 21 is a binary ONE when the bus is in an idle state. The inputs to NOR gate 21 are the BSACKR+ signal, the BSWAIT+ signal, the BSNAKR+ signal and the BSMCLR+ signal. If any one of these signals is a binary ONE, then the bus will accordingly be in a busy state and the flip-flop 22 cannot be set.

If grant flip-flop 22 has been set, the Q output signal is a binary ONE and will be inverted to a binary ZERO signal by inverter 23 and will then be placed on the bus on signal line BSDCNN-. This is shown in the timing diagram of FIG. 2 wherein the BSDCNN- signal goes from the binary ONE to the binary ZERO state. Thus, the priority cycle of the bus cycle is completed.

In addition, if the present device does require service and is the highest priority device, the output from delay 13 and the BSAUOK+ priority line will be a binary ONE, however, the $\bar{Q}$ output of flip-flop 17 will be a binary ZERO thereby placing a binary ZERO via AND gate 20 on the BSMYOK+ line thereby indicating to the next lower priority device and succeeding lower priority devices that there is a requesting higher priority device which will be using the next bus cycle, thereby inhibiting all lower priority devices from so using the next bus cycle. It should be noted that the nine priority lines received from the higher priority devices are transferred in a skewed manner by one position as signals BSBUOK+ through BSMYOK+. Thus, signal BSAUOK+ received by the present device corresponds to signal BSBUOK+ received at the next lower priority device.

Having completed a priority cycle and having now caused a binary ZERO state to be placed on the BSDCNN- line, the signal is received by all such logic as shown in FIG. 3 by receiver 24. This causes the binary ONE state to be generated at the output of receiver 24 and a binary ZERO to be provided at the output of NOR gate 26 thereby disabling AND gate 12 from generating a binary ONE state. In addition, the binary ONE state at the output of receiver 24 is received by delay line 25 which is by way of example 60 nanoseconds in duration. The output of delay line 25 is also received at the other input of NOR gate 26 so as to continue to inhibit gate 12 when the strobe is generated. Thus at the end of the delay line period established by delay line 25, the strobe (BSDCND+) signal is generated, the inversion of which, i.e., the BSDCND- signal is shown in the timing diagram of FIG. 2. The use of the strobe signal is hereinafter described. Thus the 60 nanosecond period produced by delay line 25 enables the winning device, i.e., the highest priority requesting device, to utilize the next bus cycle without interference. The strobe generated at the output of delay line 25 is used by a potential slave as a synchronizing signal.

If the strobe signal has been transmitted, then the one of the units is designated as the slave, will respond with either one of the signals, ACK, WAIT or NACK received at one of the inputs of gate 21. If in the typical case, the ACK is received, for example, or if any of such response signals are received, this will reset the grant flip-flop 22. This response is shown in the timing diagram of FIG. 2 wherein the BSACKR- signal is shown to be received from the slave thereby causing the BSDCNN- signal to change to the binary ONE state by the resetting of grant flip-flop 22. Flip-flop 15 will be reset via NOR gate 29 if the grant flip-flop 22 has been set, or if the bus clear signal, as is the case for the other two flip-flops 17 and 22 is received on the bus.

When the grant flip-flop 22 is set, its $\overline{Q}$ output goes to the binary ZERO state following which, when the grant flip-flop 22 is reset, the $\overline{Q}$ output goes from the binary ZERO to the binary ONE state thereby effectively resetting request flip-flop 17 as shall be presently explained. As may be noted from either of the aforementioned United States patents, the request flip-flop 17 was shown to be reset by either the ACK, NACK or master clear signal. With respect to the ACK or NACK signals, this assumes that the device whose request flip-flop 17 is to be reset, retained in local storage such as a flip-flop, the fact that it expected either a ACK, NACK or WAIT signal. Further, such units required logic which could discern that in fact such ACK or NACK signal was a response from a slave unit to this particular unit. Otherwise a NACK or ACK signal would couple to reset all the flip-flops 17 thereby requiring that each of such request flip-flops 17 be set again. Accordingly, logic is minimized in the system by resetting the particular unit. This is accomplished by effectively coupling the $\overline{Q}$ output of the grant flip-flop 22 to the clock input of request flip-flop 17. It should be noted that the ACK or NACK as well as the WAIT signal are utilized to reset the grant flip-flop 22, but in so doing, does not require additional logic since, in fact, only one grant flip-flop 22 could have been set. Thus, the resetting of all grant flip-flops makes no difference in the operation of the system.

In order to enable the clock input of flip-flop 17, the signal received at such clock input must be a transition from the binary ZERO to the binary ONE state. When the clock input is so enabled, the signal at the D input thereof, i.e. the BSWAIT+ signal will have its state transferred to the Q output of flip-flop 17. Accordingly, in order to effectively reset flip-flop 17, the WAIT signal must be a binary ZERO so as to cause the Q output of flip-flop 17 to be a binary ZERO when the clock input thereof is enabled. Since the WAIT signal is normally a binary ZERO, premature enabling of the clock input request flip-flop 17 may erroneously reset such flip-flop. This is so because the response from a slave unit cannot be anticipated, it being noted that the slave unit may in the alternative provide either a ACK, NACK or WAIT signal, in which case of the WAIT signal, it is not desired to reset the request flip-flop 17. Thus the clock input should be enabled only when a response has been received from the slave unit. Otherwise the WAIT signal may be in the binary ZERO state thereby prematurely resetting the request flip-flop 17.

It can be seen that under normal conditions therefore that a direct connection from the $\overline{Q}$ output to the clock input of flip-flop 17 would maintain a binary ONE state at such clock input, and that accordingly when grant flip-flop 22 is set and then reset, the change in state would enable such clock input of flip-flop 17. This condition, i.e. normally a binary ONE state at the clock input of flip-flop 17, has been found to delay the propagation of the setting action of such flip-flop wherein the Q output thereof actually realizes the set condition, i.e. the binary ONE state. More particularly, for example using a flip-flop whose part number is 74 74 which is manufactured by a number of companies including, for example, Texas Instruments Inc. and Signetic Corporation, with the clock input at a binary ONE state, it takes twice as long to realize the effect of the setting action than it does if the clock input is in the binary ZERO state. Accordingly, as can be seen by the connection of the clock input of flip-flop 22 to ground, this insures faster setting action for such grant flip-flop 22 and it is accordingly desirable to enable such increase in logic speed for the request flip-flop 17. Because of this, and the fact that the request flip-flop 17 should not be effectively reset until there is a response from the slave, elements 35 and 37 are coupled in the logic as shall be presently explained.

Before such explanation however, it should be noted that the provision of an inverter directly between the $\overline{Q}$ output of grant flip-flop 22 and the clock input of request flip-flop 17 would not be satifactory even though this would provide a normally binary ZERO state at the clock input of request flip-flop 17. This condition would not be satisfactory because the binary ONE to binary ZERO transition from the $\overline{Q}$ output of flip-flop 22 when such flip-flop is set would become a binary ZERO to binary ONE transition which would enable the clock input of flip-flop 17 prematurely, that is, prior to knowing what the response from the slave unit will be.

Accordingly, invert 35 is provided along with flip-flop 37. Like request flip-flop 17 the clock input of flip-flop 37 is not enabled until there is a transition from the binary ZERO to the binary ONE state or in other words a positive going transition. This is accordingly received, as explained hereinabove, when the grant flip-flop 22 is reset by means of NOR gate 21.

Flip-flop 37 in addition to the clock input includes a set (S), a D input, and a reset (R) input. The set input is effectively diabled by setting the input thereof to the binary ONE state by means of the MYPLUP+ signal which is no more than a signal received via a pullup resistor to a plus voltage. The D input of flip-flop 37 is coupled to the output of NOR gate 26 by means of inverter 35. Normally the output of NOR gate 26 is a binary ONE and accordingly the output of inverter 35 is a binary ZERO. These conditions are changed when the BSDCNN- signal goes to the binary ZERO state just after time 7-C, i.e., the 7-C plus the delay period associated with elements 24 and 26. Thus shortly after time 7-C the output of NOR gate 26 will change to the binary ZERO state thereby presenting a binary ONE state at the D and reset inputs of flip-flop 37. It is noted that a change in the binary ONE state to the binary ZERO state will reset flip-flop 37 thereby presenting a binary ZERO state at the Q output of flip-flop. A binary ONE state at the output of inverter 35 continues for so long as the BSDCNN- signal is a binary ZERO and for 60 nanoseconds thereafter consistent with the delay period of delay 25. Shortly after the grant flip-flop 22 is reset and before the BSDCNN- signal has an affect on the output of NOR gate 26, the clock input of flip-flop 37 is enabled so that a binary ONE state at the D input thereof causes the Q output of flip-flop 37 to change from the binary ZERO to the binary ONE state thereby enabling flip-flop 17. At the time when the strobe signal, i.e., the BSDCND+ signal is no longer present, as can be seen with respect to the BSDCND- signal as shown in the timing diagram of FIG. 2, and more particularly at time 7-G, the output of NOR gate 26 changes back to the binary ONE state thereby causing the output of inverter 35 to change from the binary ONE state to the binary ZERO state thereby resetting flip-flop 37. The binary ZERO state thereafter continues to be present at the Q output of flip-flop 37 until the above operation is again commenced.

The coupling of the output of inverter 35 to the D input as well as the reset input of flip-flop 37 enables better pulse shaping to be provided at the Q output of flip-flop 37. In addition, based upon the fact that a change in binary state from the binary ONE state to the binary ZERO state will reset the flip-flop 37, this insures that the flip-flop 37 will be reset prior to the enabling of the clock input of flip-flop 37.

As discussed hereinbefore, the coupling between the Q output of request flip-flop 17 and NAND gate 19 is dependent upon the position of the unit on the bus 200. More particularly, the element 28 in such coupling between flip-flop 17 and NAND gate 19 is a direct connection for all units which are not the highest priority unit. For the unit which is the highest priority unit and, more particularly, by the illustration of FIG. 1, memory 202, element 28 is a delay element similar to delay 13 and, by way of illustration, may include a delay of 20 nanoseconds. The reason for this is that in the highest priority unit top nine inputs of its NAND are a binary ONE signal. This binary ONE signal may be provided for each such one of the nine lines by means of a pullup resistor coupled thereto, the other end of which is coupled to a plus voltage source similar to the manner in which the MYPLUP+ signal is so coupled. With each of the nine inputs to NAND gate 19 being a binary ONE, and with the BSDCNB- signal being normally a binary ONE, and further assuming that the user ready signal is in the binary ONE state, then without a delay element 28 in the priority logic of the highest priority unit, such highest priority unit would always win access to the bus without incurring the delay provided by delay 13. Thus, by providing a delay in element 28, this prevents the highest priority device from setting its grant flip-flop for the period of, for example, 20 nanoseconds after the time it sets its request flip-flop 17. In the highest priority unit, and in parallel with the delay element 28, a direct connection may also be provided with the other inputs to gate 19 so as to avoid the enabling of gate 19 due to a momentary pulse generated at the Q output of flip-flop 17 because of, for example, a race condition in the logic of FIG. 3.

Thus, in this manner, the highest priority unit is also prevented from gaining access to the bus 200 during a bus cycle of another unit. This is so because the BSDCNB- signal will be binary ZERO if, in fact, another bus cycle is in process. It can be seen that this inhibiting of the priority logic of the highest priority unit may be accomplished in other ways. For example, as explained in either of the aforementioned United States patents, the output of delay 13 may be coupled to another input of NAND gate 19 in which case, for each priority logic of each unit, this would replace the need for BSDCNB- signal at one input of gate 19 and the need for a delay element 28 in the priority logic of the highest priority unit. However, in logic which requires the extreme speed as indicated herein, loading effects depending upon the component picked may present a problem. Accordingly, by the technique as explained herein, the delay 13 includes two element loads as opposed to three element loads. It can be further seen that such loading problem might be prevented by placing a driver or amplifying element at the output of delay 13, the output of which driver would be coupled to NAND gate 19, NOR gate 14 and AND gate 20, without presenting a loading problem. However, this has the effect of slowing down the operation of the priority logic by a factor determined by a propagation delay through such driver element.

While the invention has been particularly shown and described with reference to preferred embodiments thereof, it will be understood by those skilled in the art that the foregoing and other changes in form and details may be made therein without departing from the spirit and scope of the invention.

Having described the invention, what is claimed as new and novel and for which it is desired to secure Letters Patent is:

1. In a data processing system having a plurality of units coupled to transfer information over a common electrical bus, each of said units capable of either or both transferring or receiving information, a distributed priority network, said network including priority logic in each of said units, said priority logic comprising:
   A. first bistable means for asynchronously indicating that a representative unit is ready to transfer information over said bus;
   B. second bistable means, responsive to said first bistable means indicating that said representative unit is ready to transfer information over said bus, for generating a first signal on said bus indicating to each of said units that said representative unit is ready to transfer information over said bus;
   C. means, responsive to the absence of a said first signal from said second bistable means in each of said units having a higher priority than said representative unit, for indicating that said representative unit is the highest priority unit;

D. third bistable means, responsive to said first signal generated by said second bistable means and an indication that there is no other higher priority unit ready to transfer information over said bus, for generating a second signal on said bus;

E. means, responsive to the receipt of said second signal from said bus, for generating a strobe signal for enabling the receipt of information from said representative unit;

F. first means, responsive to an acknowledgement that said information has been received, for disabling said third bistable means of said representative units; and G. second means, responsive to the disabling of said third bistable means, for disabling said second bistable means of said representative unit.

2. Logic as in claim 1 wherein said acknowledgement may include a first acknowledgement signal indicating that said information has been accepted; a second acknowledgement signal indicating that said information has not been accepted; or a third acknowledgement signal indicating that said information has not ben accepted but that said information would probably be accepted if transferred again; and wherein said first means for disabling is responsive to either said first, second or third acknowledgement signal; and wherein said logic further comprises means, coupled with said second means for disabling, for inhibiting the disabling of said second bistable means if said third acknowledgement signal is received by said representative unit.

3. Logic as in claim 2 further comprising means, responsive to said strobe signal, for enabling said second means for disabling.

4. Logic as in claim 3 wherein said second means for disabling is a fourth bistable means, and wherein said third acknowledgement signal is coupled for receipt by said second bistable means in response to the enabling of said fourth bistable means.

5. Logic as in claim 4 further comprising:
A. gate means coupled to provide said indication that there is no other higher priority unit ready to transfer information over said bus; and
B. a coupling between said second bistable means and said gate means, said coupling including
(1) a direct connection for the priority logic in each of said units except that unit having the highest priority, and
(2) a delay element for the unit having the highest priority for the purpose of inhibiting said highest priority unit from gaining access to said bus while another said unit is transferring information over said bus.

6. Logic as in claim 5 further comprising means coupled with said gate for inhibiting a said unit from using said bus even though said unit is the highest priority unit requesting use of said bus.

7. Logic as in claim 1 further comprising:
A. gate means coupled to provide said indication that there is no other higher priority unit ready to transfer information over said bus; and
B. a coupling between said second bistable means and said gate means, said coupling including
(1) a direct connection for the priority logic in each of said units except that unit having the highest priority, and
(2) a delay element for the unit having the highest priority for the purpose of inhibiting said highest priority unit from gaining access to said bus while another said unit is transferring information over said bus.

8. Logic as in claim 1 further comprising means coupled with said third bistable means for inhibiting a said unit from using said bus even though said unit is the highest priority unit requesting use of said bus.

9. A data processing system having a priority determining system comprising:
A. a plurality of units, said units including a memory, a data processor, and at least one peripheral device controller, each of said units having a different priority and each of said units capable of either or both transferring or receiving information;
B. a common electrical bus, coupled with each of said units, for providing a path for the asynchronous transfer of said information between any two of said units, said bus having first and second ends, the end of said units coupled closest to said first end having the highest priority, and the one of said units coupled closest to said second end having the lowest priority, and the other ones of said units having a priority relative to their proximity to said first and second ends; and
C. a priority network included in each of said units comprising:
(1) first means for asynchronously generating a first signal indicating that a requesting one of said units is ready to transfer information over said bus to another one of said units,
(2) first means, responsive to said first signal, for indicating on said bus by the generation of a second signal, that said requesting unit is ready to transfer information over said bus to another one of said units,
(3) second means, responsive to a said second signal from said first means for indicating in each of said units, for indicating whether any higher priority unit than said requesting unit is also requesting to transfer information over said bus,
(4) first logic means, coupled with said first and second means for indicating and responsive to said second signal, for generating a third signal if no other said higher priority unit is also requesting to transfer information over said bus as indicated by said second means for indicating,
(5) second means, responsive to said third signal, for generating a fourth signal on said bus indicating that said requesting unit is the only one of said units presently allowed to so transfer information over said bus,
(6) second logic means, responsive to said fourth signal for inhibiting any other said units for transferring information over said bus while said requesting unit is transferring information over said bus,
(7) a first logic element responsive to an acknowledgement that said information has been received, for diabling said second means for generating of the unit which has transferred information over said bus, and
(8) a second logic element, responsive to the disabling of said second means for generating, for disabling said first means for indicating of said unit which has transferred information over said bus.

10. Logic as in claim 9 wherein said acknowledgement includes either a first acknowledgement signal indicating that said information has been accepted; a second acknowledgement signal indicating that said information has not been accepted; or a third acknowledgement signal indicating that said information has not been accepted but that said information would probably be accepted if transferred again; and wherein said first logic element for disabling is responsive to either said first, second or third acknowledgement signal; and wherein said logic further comprises means, coupled with said second logic element for disabling, for inhibiting the disabling of said first means for indicating if said third acknowledgement signal is received by said requesting unit.

11. A system as in claim 10 further comprising means, in each of said units and responsive to said fourth signal, for generating a strobe signal for enabling the transfer of information over said bus from said unit generating said fourth signal.

12. Logic as in claim 11 further comprising means, responsive to said strobe signal, for enabling said second logic element for disabling.

13. Logic as in claim 12 wherein said second logic element for disabling is a fourth bistable means, and wherein said third acknowledgement signal is coupled for receipt by said second bistable means in response to the enabling of said fourth bistable means.

* * * * *